(12) United States Patent  (10) Patent No.: US 8,526,548 B2
Gu                         (45) Date of Patent: Sep. 3, 2013

(54) MATCHED FILTER CIRCUIT APPARATUS IN THE BASE BAND PROCESS SYSTEM OF THE TERMINAL DEVICE AND METHOD THEREOF

(75) Inventor: Yantao Gu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 245 days.

(21) Appl. No.: 13/057,647

(22) PCT Filed: Aug. 11, 2009

(86) PCT No.: PCT/CN2009/073191
§ 371 (c)(1),
(2), (4) Date: Feb. 4, 2011

(87) PCT Pub. No.: WO2010/017763
PCT Pub. Date: Feb. 18, 2010

(65) Prior Publication Data
US 2011/0142182 A1    Jun. 16, 2011

(30) Foreign Application Priority Data
Aug. 13, 2008 (CN) .......................... 2008 1 0142497

(51) Int. Cl.
*H03D 1/00* (2006.01)
(52) U.S. Cl.
USPC ............................ 375/343; 375/340; 370/320
(58) Field of Classification Search
USPC .......................................................... 375/343
See application file for complete search history.

(56) References Cited

U.S. PATENT DOCUMENTS

2006/0292292 A1* 12/2006 Brightman et al. ............. 427/66
2007/0058699 A1*  3/2007 Chen et al. ..................... 375/149

FOREIGN PATENT DOCUMENTS

| CN | 1553607 A | 12/2004 |
| CN | 1604512 A | 4/2005 |
| CN | 1874189 A | 12/2006 |
| JP | 2003108046 A | 1/2003 |

OTHER PUBLICATIONS

International Search Report for PCT/CN09/073191 dated Nov. 9, 2009.

* cited by examiner

*Primary Examiner* — Erin File
(74) *Attorney, Agent, or Firm* — Banner & Witcoff, Ltd.

(57) ABSTRACT

The present invention discloses a matched filtering circuit apparatus in the baseband processing system of the terminal device and method thereof. The circuit apparatus comprises a control unit for controlling the processing procedures of de-scrambling, de-spreading, de-rotating and maximal ratio combining data, the output ports of the control unit connects with a V vector buffer unit, a shift integral selection unit and a coherent integral unit for implementing the matched filtering and data buffer. Due to the application of entirely pipeline design structure, the processes of data buffer and matched filtering can be carried out simultaneously, thus shortening time consumption of the terminal hardware accelerator and effectively improving the operation efficiency of the mobile communication terminal hardware system.

9 Claims, 3 Drawing Sheets

MATCHED FILTER CIRCUIT APPARATUS IN THE BASE BAND PROCESS SYSTEM OF THE TERMINAL DEVICE AND METHOD THEREOF

TECHNICAL FIELD

The present invention relates to the field of joint detection circuit in a baseband processing system of a mobile communication terminal device, and more especially, to a matched filtering circuit apparatus in a baseband processing system of a terminal device and method thereof.

BACKGROUND OF THE RELATED ART

In the baseband processing system of the mobile communication terminal device, the conventional detection technology detects signals of one user while takes the signals of other users as noise. However, when the number of users increases, this method easily deteriorates the SNR so as to make the system performance and capacity undesirable. However, the joint detection technology fully uses all users' signals which cause the multiple access interference as well as the prior information of the correlated muitipath on the basis of the conventional detection technology and takes the user signal separation as a uniform correlated joint detection process, therefore it has better anti-interference performance and decreases the requirements of power control precision by the system. Therefore, this technology could use the uplink and downlink spectrum resource more effectively, thereby improving the system performance and increasing the system capacity significantly.

In the mobile communication baseband processing system of the TD-SCDMA terminal device, baseband processing algorithm of the joint detection is generally used and an important algorithm circuit, that is, the matched filter circuit, is always comprised in the joint detection.

As shown in FIG. 1, first, the serial interference cancellation module uses the Midamble sampling data of the destination cell in one time slot to cancel the serial interference coming from interference cells many times in turn to acquire a relatively accurate initial channel estimation result; meanwhile, the local spreading codes of the target cell are scrambled, rotated and conjugated to form composite spectrum spreading code in composite spectrum spreading code generation module; and then activation detection is performed on all candidate code channels according to the initial channel estimation result and composite spectrum spreading codes to determine finally which candidate code channels will be taken as the activated channels to join in the joint detection; second, the initial channel estimation result are post-processed to obtain the accurate channel estimation post-processing result; the channel estimation post-processing result and the composite spectrum spreading codes of the activated channels are convoluted to acquire the V vector in each activated channel; and then, the V vector is used to perform matched filtering on the data domain sampling data in a time slot to get the de-scrambled, de-spread, de-rotated, maximum ratio combined symbol data; the matched filter circuit sends the symbol data to a matrix operation module for canceling the inter-symbol and inter-channel interferences; the interference-cancelled symbol data are used as the final output result of the joint detection algorithm and sent to the symbol processing subsystem to implement the de-mapping process from the physical channel to transmission channel; and the de-mapping result is sent to the software for the afterwards task scheduling through the software and hardware interface.

However, the joint detection algorithm of TD-SCDMA system is of great algorithm complexity and requirement for the processing time is very strict. In view of cost and power consumption, the like of high performance software platform in the base station is hardly possible to be applied in the TD-SCDMA mobile terminals, therefore, a large number of hardware accelerators have to be designed for the TD-SCDMA mobile terminals in order to reserve enough processing time for the terminal software platform, which, however, must raise the cost for the complexity and is not practical as a result.

Moreover, the TD-SCDMA mobile terminal has to face higher requirement of operation speed by the hardware accelerator: for example, the spreading factor is 8 on uplink and 16 on downlink, one code channel is occupied on uplink and two code channels are occupied on downlink which are necessary in joint detection of the TD-SCDMA system at the case of 12.2kbps voice service. Take the matched filter operation whose spreading factor (SF) is 16 for example, the matched filter of the mobile terminal needs to matched filter 31 chip data in order to acquire one symbol that is de-spread, de-scrambled and completed channel compensation, and there are total 44 symbols in two data domain of one time slot in TD-SCDMA system need to be acquired in one code channel in the joint detection; this process has to be repeated for 16 times to acquire the symbols in 16 code channels, so as to complete the matched filter process of all code channels in one time slot, thus 31×44×16=21824 matching operations have to be performed.

It can be seen that having the high-speed matched filter circuit is very important to improve the operation efficiency of the TD-SCDMA baseband processing subsystem; however, the existing matched filter is generally implemented based on the baseband algorithm used in base station subsystem and since the pressure caused by cost of base station is much smaller than that of the mobile terminal side, for example, the base station side could apply high-performance software processer, which is hardly possible at mobile terminal equipments because of the cost; moreover, the hardware accelerator in the base station has less requirement of time and power consumption than the hardware accelerator in the mobile terminal has; therefore, the existing matched filter apparatus in the base station is too lack of generality to be applied directly in the terminal device.

Therefore, the prior art needs to be improved and developed.

CONTENT OF THE INVENTION

To solve the problem existing in the prior art, the present invention provides a matched filtering circuit apparatus in a baseband processing system of a terminal device and a method thereof. Thereby shortening processing time of terminal hardware accelerator and improving operation efficiency of mobile communication terminal hardware system. The matched filtering circuit apparatus and the method are simple, practical and universal.

The technical scheme of the present invention is as below:

A matched filtering circuit apparatus in a baseband processing system of a terminal device, being located in a joint detection circuit in the baseband processing system, comprises a control unit, a V vector buffer unit, a shift integral selection unit, a correlator unit, as well as a coherent integral unit, wherein, the control unit is configured to control processing procedures of de-scrambling, de-spreading, de-rotating and maximum ratio combining data; an output port of the control unit connects to the V vector buffer unit, the shift integral selection unit and the coherent integral unit simultaneously; the V vector buffer unit is configured to perform data buffer while performing matched filtering operation.

Furthermore, in the matched tittering circuit apparatus, a front end of the coherent integral unit connects to the correlator unit, and also connects to the V vector buffer unit and the shift integral selection unit through the correlator unit; the correlator unit is configured to perform correlated processing for parallel data and perform summation operation on correlated results.

Furthermore, in the matched filtering circuit apparatus, input ports of the correlator unit connects to an output port of the V vector buffer unit and an output port of the shift integral selection unit, the output port of the V vector buffer unit provides the correlator unit with V vectors for matching filtering operations, and the output port of the shift integral selection unit provides the correlator unit with correct antenna sampling data for matching filtering operations, correlated operations, that is, matched filtering operations are performed on the V vectors and antenna sampling data in the correlator unit.

Furthermore, in the matched filtering circuit apparatus, the control unit comprises a control signal generation logic unit and a counter, wherein the control signal generation logic unit is located at the output port of the control unit; the counter connects to the control signal generation logic unit and is configured to count under the control of a matched filtering start indication signal, and send the counted result to the control signal generation logic unit as a time coordinate of a matched filter.

Furthermore, in the matched filtering circuit apparatus, the control signal generation logic unit is located behind the counter and is configured to generate and output a V vector buffer unit control signal, a shift buffer enabling and selection control signal, and an integral unit control signal.

Furthermore, in the matched filtering circuit apparatus, the V vector buffer unit comprises a plurality of two-port serial buffers, and the two-port serial buffers are configured to buffer and read out V vector elements under the control of the V vector buffer unit control signal.

Furthermore, in the matched filtering circuit apparatus, the shift integral selection unit comprises two shift buffer register groups and one selector group, wherein the selector group is located between the two shift buffer register groups and configured to sample and output antenna data buffered in real time in the shift integral selection unit under the control of the shift buffer enabling and selection control signal.

Furthermore, in the matched filtering circuit apparatus, the correlator unit comprises a plurality of correlators and an adder group, input ports of the correlators directly connect to an input port of the adder group, the correlator is configured to multiply the V vector elements with the antenna data, the accumulator group is configured to accumulate the multiplication result of a single correlator.

Furthermore, in the matched filtering circuit apparatus, the coherent integral unit comprises a selector, a coherent integral accumulator and a coherent integral buffer, wherein an input port of the coherent integral accumulator connects to output ports of the selector and the correlator unit and an output port of the coherent integral accumulator connects to an input port of the coherent integral buffer; the coherent integral accumulator is configured to implement integral operation on all symbol data in code channels under the control of the integral unit control signal.

A matched filtering method in a baseband processing system of a terminal device, the method comprises the following steps of:

providing a matched filter circuit apparatus which comprises a control unit, a coherent integral unit and a correlated integral buffer;

the control unit of the matched filtering circuit apparatus generating and outputting a coherent integral control signal;

wherein the coherent integral control signal is in valid state in a working clock of a first calculation period of each group of demodulated data, while in invalid state in a working clock of a second calculation period of each group of demodulated data;

when the coherent integral control signal is valid, the coherent integral unit in the matched filtering circuit apparatus directly accumulating the current input correlated summation and buffering the accumulation result into the coherent integral buffer of the matched filtering circuit apparatus as calculation result of the current period; and when the coherent integral control signal is invalid, the coherent integral unit of the matched filtering circuit apparatus accumulating the current input correlated summation result and calculation result of the first calculation period buffered in the coherent integral buffer of the matched filtering circuit apparatus to demodulate out a group of complete symbol data.

The matched filtering circuit apparatus in a baseband processing system of a terminal device and the method thereof provided in the present invention can buffer data and perform matched filtering simultaneously since it applies a totally pipeline design structure, thus effectively utilize each processing clock, largely shorten the time consumption of terminal hardware accelerator, guarantee the stable operation of the software platform on the side of time, so as to effectively improve the operation efficiency of a mobile communication terminal hardware system; the high-speed matched filtering circuit is also very universal and can adjust the size of the shift register group within the shift buffer selector unit and the number of correlators internal the correlator unit so as to make it compatible with a plurality of matched filtering algorithms in different application environments; Additionally, the control logic of this matched filter circuit apparatus is simple and easy to be implemented, thus it has very strong practicality and utilization value.

PREFERRED EMBODIMENTS OF THE PRESENT INVENTION

The matched filter circuit apparatus in a baseband processing system of a terminal device in the present invention and the method thereof will be described in detail by referring to the accompanying figures and the preferred embodiments and examples.

The main point of the matched filter circuit apparatus in the baseband processing system of the terminal device in the present invention and the method thereof is that the pipeline design structure and the simultaneous processes of data buffer and matched filter can improve the operation efficiency of the mobile communication terminal hardware system; since the design and the manufacturing technology of mobile communication terminal devices, such as TD-SCDMA, are familiar to those skilled in the field, they are not repeated here.

According to the processing feature of TD-SCDMA terminal baseband algorithm, regarding n working clocks as a processing period, the n is the number of code channels that matched filter must deal with here and thanking for the totally pipeline design structure, the antenna data of the next processing period are buffered while completing matched filtering operation for the n code channels, thus the data buffer and operating processes are totally matched, all the operation time of each processing clock is effectively used, and the time consumption of the hardware accelerator is largely reduced.

Figure 1:
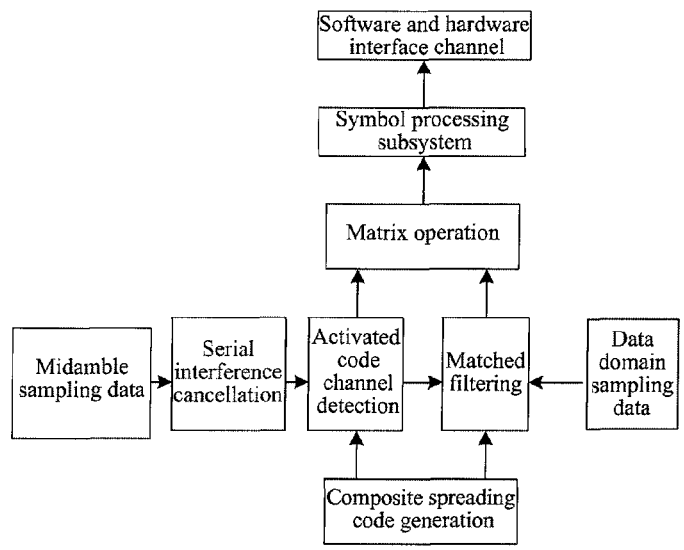
FIG. 1 is a block diagram of a TD-SCDMA digital baseband processing subsystem in the prior art.
Figure 2:
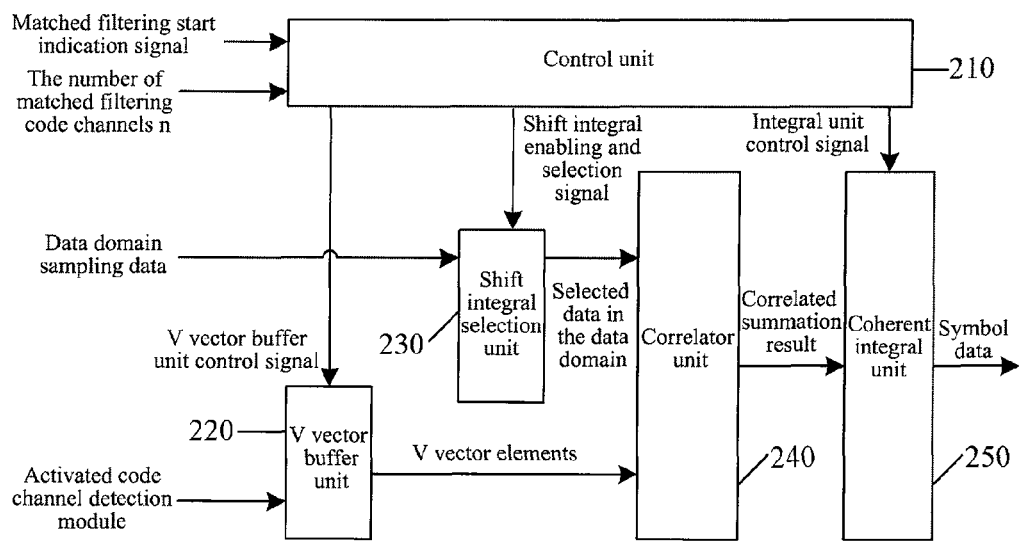
FIG. 2 is a block diagram of the structure of a matched filtering circuit apparatus in accordance with the present invention.

As shown in FIG. 2, n matched filtering operations for n code channels are implemented in one processing period, and the matched filter circuit apparatus comprises five units: control unit 210, V vector buffer unit 220, shift integral selection unit 230, correlator unit 240 and coherent integral unit 250, and said control unit 210 connects to V vector buffer unit 220, shift integral selection unit 230 and coherent integral unit 250, and said correlator unit 240 is located at the front end of the coherent integral unit 250, the input ports of said correlator 240 connects to V vector buffer unit 220 and shift integral selection unit 230 simultaneously, wherein:

1) The main function of control unit 210 is controlling the operation of the matched filtering operation circuit and adjusting the timing of the whole matched, filter process, and the input data of control unit 210 are external matched filtering start indication signal and the number of matched filter code channels n, the signal to control V vector buffer unit at the output port of control unit 210 connects to the V vector buffer unit 220, the shift integral enabling and selection signals at the output port of the control unit 210 connect to the shift integral selection unit 230, and the integral unit control signal at the output port of the control unit 210 connects to the coherent integral unit 250.

Figure 4:
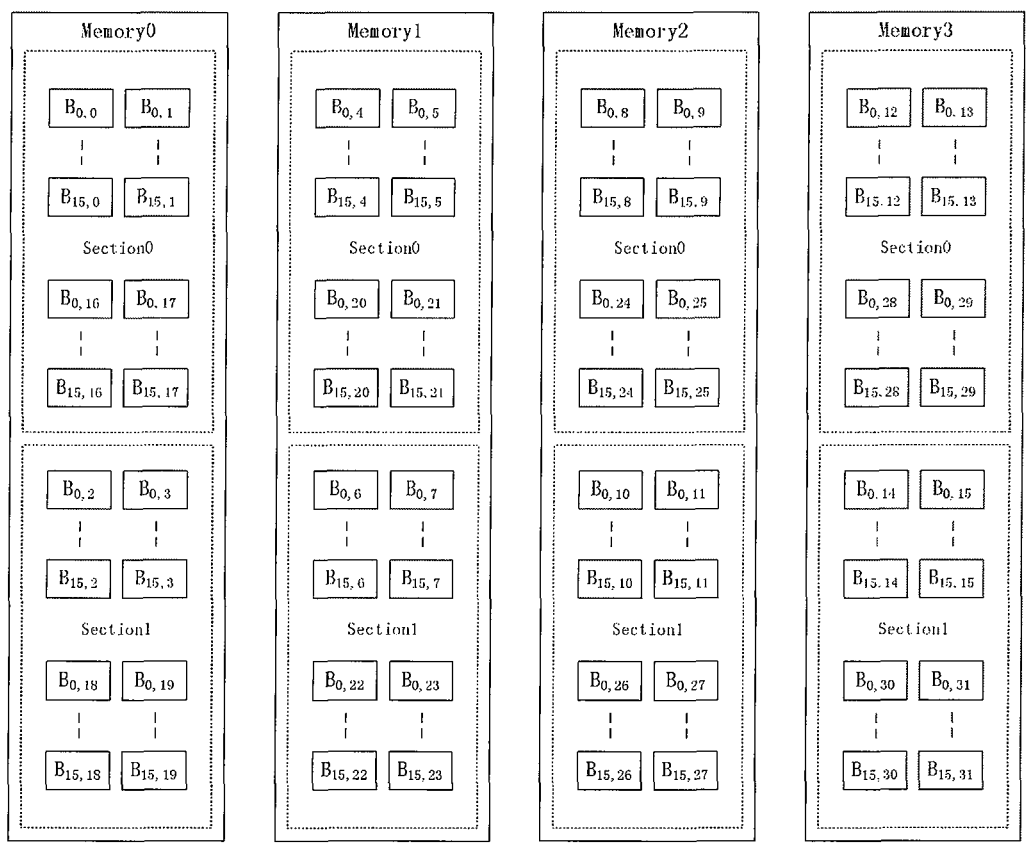
FIG. 4 is a block diagram of the hardware implementation structure of a V vector buffer unit in accordance with the present invention.

2) The main function of V vector buffer unit 220 is, as shown in FIG. 4, buffering V vectors output from the front-end module, namely activated code channel detection module in different sections of the different V vector Buffers by the order of code channel, and then reading out the corresponding V vector elements of the target code channels under the control of V vector buffer unit control signal; the input port of the V vector buffer unit 220 connects to the V vector element signal output by the activated code channel detection module and the V vector buffer unit control signal output by the control unit 210; while the output port of the V vector buffer unit 220 sends the V vector elements of the target code channels to the correlator unit 240.

Figure 5:
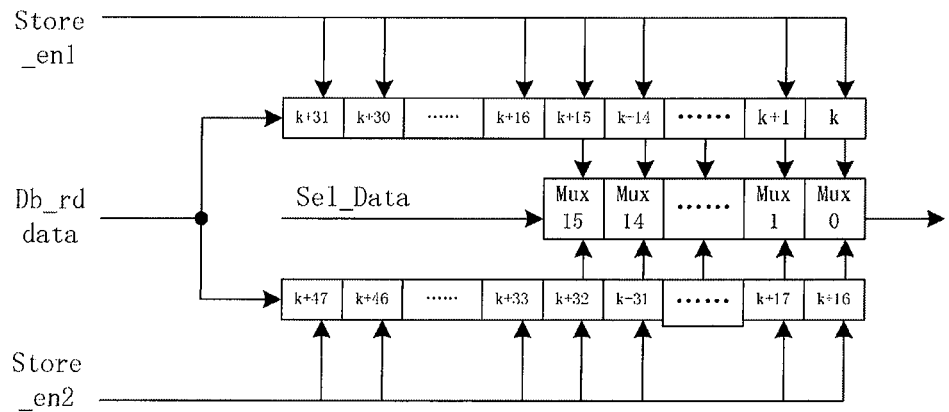
FIG. 5 is a block diagram of the hardware implementation structure of a shift integral selector unit in accordance with the present invention.

3) The main function of the shift integral selection unit 230 is shifting the data domain sampling data input by an external module and buffering the data into two internal shift buffer register groups according to the shift integral enabling and selection signals as shown in FIG. 5, and meanwhile the selector group in the shift integral selection unit 230 selects one group of registered data from the two shift buffer register groups and outputs the data; the input port of the shift integral selection unit 230 connects to the data domain sampling data output by an external module and the shift integral enabling and selection signals of the control unit 210 respectively, and the Output port of the shift integral selection unit 230 outputs the selected data domain sampling signal to the correlator unit 240.

Figure 6:
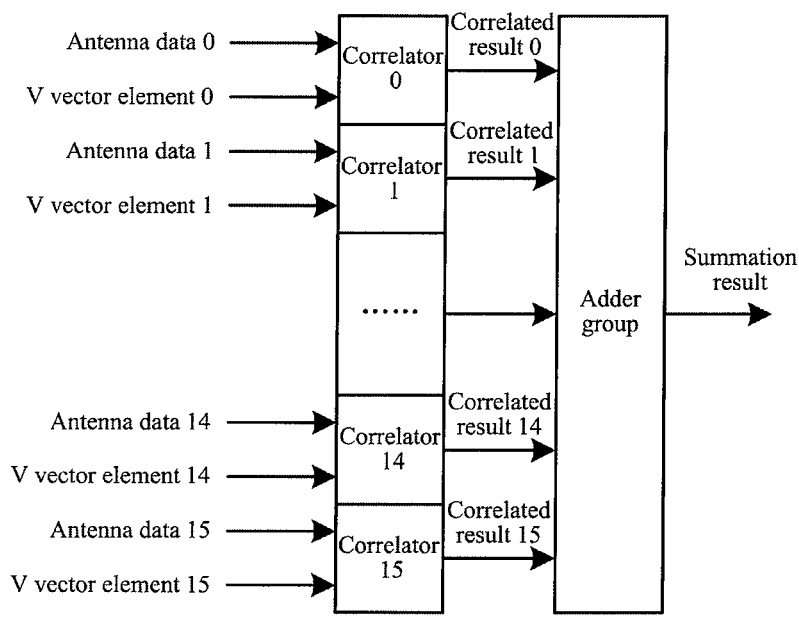
FIG. 6 is a block diagram of the hardware implementation structure of a correlator unit in accordance with the present invention.

4) The main function of the correlator unit 240 is performing correlation processing on n data in parallel and summing up n correlated results, as shown in FIG. 6, its output port connects to the selected data domain sampling data output by the shift integral selection unit 230 and the V elements output by the V vector buffer unit 220, and the output port connects the correlation summed result to the coherent integral unit 250.

Figure 7:
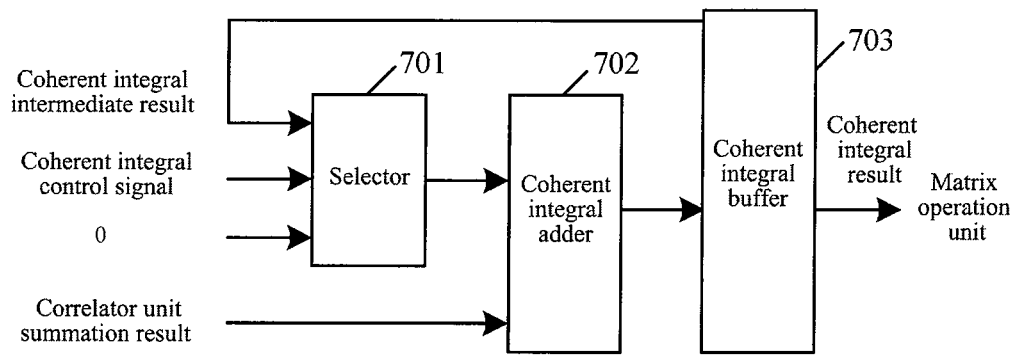
FIG. 7 is a block diagram of the hardware implementation structure of a coherent integral unit in accordance with the present invention.

5) The main function of the coherent integral unit 250 is integrating the chip data belonging to one symbol under the control of the integral unit control signal, as shown in FIG. 7, its input port connects to the integral unit control signal output by control unit 210 and the summation of n correlated results output by the correlator unit 240, and its output port sends the completely output data symbols to the matrix operation module at the back end of the matched filter unit.

After said matrix operation module cancels the inter-symbol and inter-channel interferences, the symbol-level processing subsystem implements the process of dc-mapping the physical channel to the transmission channel, and the final de-mapping result will be reported to the DSP (Digital Signal Processor) through the interface between software and hardware for the further service scheduling.

Figure 3:
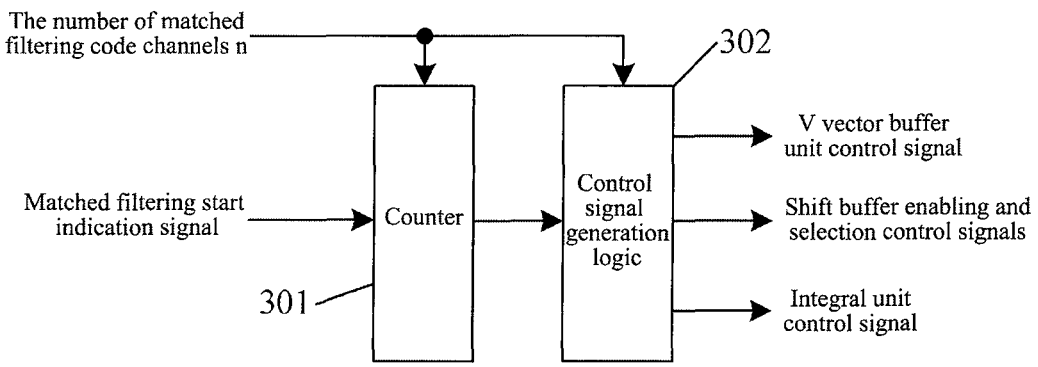
FIG. 3 is a block diagram of the hardware implementation structure of a control unit in accordance with the present invention.

In the above, a high-speed matched filtering circuit is provided according to the performance requirements of TD-SCDMA terminal hardware accelerator and in combination with the feature of terminal baseband algorithm. The circuit can implement a plurality of matched filtering operations at every working clock, thus effectively improves the operation efficiency of TD-SCDMA terminal hardware system, largely shortens the time consumption of hardware accelerator, and reserves enough time to guarantee the stable operation of the software platform. Additionally, the control logic of this circuit is very simple and easy to be implemented, thus it has relatively high practicality. According to the TD-SCDMA protocol, there are only two spreading factors existing in the downlink, SF equals 1 and SF equals 16, and since the latter is more general, the matched filter operation whose SF is 16 is taken as example to describe the implementation of the matched filter circuit apparatus and to illustrate the working principle of each unit in detail:

As shown in FIG. 3, the control unit 210 of the matched filtering circuit apparatus is used to control the whole matched filtering operation process, to control the processes of dc-scrambling, dc-spreading, de-rotating and maximum ratio combining symbol matched data, and it mainly comprises two functional parts: counter 301 and control signal generation logic 302, and said control signal generation logic 302 is located at the output of said control unit 210, said counter 301 connects to said control signal generation logic 302 which is located at the back end of said counter 301.

The main function of the counter 301 is counting under the control of the matched filtering start indication signal, and the counting period is defined by the number of channels 16 to be matched filtered currently, and the counting result of the counter 301 is taken as the time coordinate of the matched filter and sent to the control signal generation logic 302;

The main function of the control signal generation logic 302 is generating and outputting V vector buffer unit control signal, shift buffer enabling and selection control signals as well as the integral unit control signal when there are 16 code channels to be matched filtered currently; wherein:

The V vector buffer unit control signal consists of the V vector buffer unit read-enabling signal and address-reading signal; the V vector buffer unit read-enabling signal can be acquired by comparing the current counting value of the counter and the threshold 1408, and if the counting result is less than 1408, read-enabling is valid, otherwise, it is invalid; the V vector buffer unit address-reading signal is defined by the lowest four bit counting value of the counter;

The shift buffer enabling and selection control signals comprises three parts: the shift buffer register group 1 enabling signal store_en1, the shift buffer register group 2 enabling signal store_en2 and selection control signal sel_data, if 16 is taken as one counting period of the counter, both store_en1 and store_en2 are valid in the first and second counting periods; afterwards, store_en1 is invalid in the third counting period while store_en2 is still valid, and sel_data is in the state of 0; store_en1 is valid, store_en2 is invalid, and sel_data is in the state of 1 in the fourth counting period; in the fifth counting period, store_en1 is invalid, store_en2 is valid, and sel_data is in the state of 0, and so on;

The integral control signal is also defined by the counter, and once 32 is less than 16 in the counting result module of the counter and the state of the fifth bit in the counter is 0, the coherent integral control signal is enabled; otherwise, it is set as invalid.

In this case, the main function of the V vector buffer unit 220 is receiving the V vector generated by the front-end activated code channel detection module, reading out the V vectors from the four internal two-port serial buffers respectively and sending them to the correlator unit 240 under the control of the V vector buffer unit control signal, and port A write-enabling signals of the four buffers can be respectively enabled when buffering V vector elements, and data are serially buffered into the four buffers, as shown in FIG. 4, B0,0, B0,1, . . . , B15,30, and B15,31 are uniformly indicated with Bm,n. Bm,n denotes the $n^{th}$ V vector element acquired in the $m^{th}$ code channel, and each address unit buffers two V vector elements, and when reading out the V vector elements, it needs to use A and B ports of the four butlers to read out the V vector elements simultaneously according to the V vector buffer unit control signal output by the matched filtering control unit 210, wherein, port A takes 16 clocks as a period to circularly address Section 0 space, and port B also takes 16 clocks as a period, to address in Section 1 space in sequence circularly; both ports send the read-out data to the correlator unit 240.

In this case, the main function of the shift integral selection unit 230 is alternatively buffering the read-out antenna data to two shift buffer groups in real time and sending the correct 16 sampling data to the correlator unit 240 according to the selected control signals. As shown in FIG. 5, it comprises two shift buffer register groups and one selector group, and said selector group is located between the two shift buffer register groups, and the shift integral selection output unit shifts and buffers the sampling data according to store_en1 and store_en2, and when store_en1 is valid, the antenna data Db_rddata is right-shifted and buffered into the first shift buffer register group, and when store_en1 is invalid, terminate the shift buffer processes; similarly; the second shift buffer register group butlers the antenna data under the control of store_en2, and the selector group outputs 16 antenna data from the two shift register groups according to the selection control signal sel_data, and when the state of sel_data is 0, select and output the content of the first group of k to k+15 register groups, and the output result is sent to the correlator unit 240; when the state of sel_data is 1, select and output the content of the second group of k+16 to k+31 register groups, and the output result is sent to the correlator unit 240;

In this case, the function of the correlator unit 240 is implementing the correlation operation of the 16 data in parallel and summing up the 16 correlation results, as shown in FIG. 6, it consists of 16 correlators, and the output port of said correlators directly connects to the input port of the adder group, an antenna data and a V vector element are input into each correlator and multiplied together, and the product is accumulated in said adder group and the calculation result is sent to the coherent integral unit 250 for inter-symbol coherent integral.

In this case, the main function of coherent integral unit 250 is accumulating the summation result output by the correlator unit 240 and the summation result of the same symbol in the previous period under the control of the coherent unit control signal and buffering the accumulation result into the internal coherent integral buffer, as shown in FIG. 7, it comprises a selector 701, a coherent integral accumulator 702 and a coherent integral buffer 703, the input port of said coherent integral accumulator 702 connects to the output port of said selector 701 and the output port of said correlator unit 240 simultaneously, and the output port of said coherent integral accumulator 702 connects to the input port of said coherent integral buffer 703.

When the coherent integral unit 250 starts to work, the coherent integral control signal will be valid continuously in the 16 clocks of the first calculation period of each group of demodulated data, which means starting the process of matched filtering of a group of new symbols, now the selector 701 selects 0 and outputs it to the coherent integral accumulator 702, and in the coherent integral accumulator 702, directly accumulate the currently input correlation summation result, and the accumulation result is taken as the calculation result of the current period and buffered in the correlation integral buffer 703; the coherent integral control signal will be invalid continuously in the 16 clocks of the second calculation period of each group of demodulated data, now the coherent integral accumulator 702 directly accumulates the currently input correlation summation result and the correlation summation result acquired in the first calculation period and buffered in the coherent integral buffer 703, so as to obtain the complete symbol data; and then repeat the demodulation of the next symbol data group, and so on, until all 704 symbols in the 16 code channels are demodulated.

In this case, the digital baseband processing system of TD-SCDMA mobile terminal activates the matrix operation module following the matched filtering circuit to cancel the inter-symbol and inter-channel interferences; the interference-cancelled result completes the reverse mapping from the physical channel to the transmission channel through the symbol processing subsystem; and the final mapping result is reported to the DSP through the software and hardware interface chan and the DSP will perform the task scheduling.

In the above specific embodiments, the matched filtering circuit apparatus and method can apply all possible existing schemes according to the practical applications, and all these schemes are familiar to those skilled in the field and will not be repeated here.

The matched filtering circuit apparatus in a baseband processing system of a terminal device provided, in the present invention and the method thereof can buffer data and perform matched filtering simultaneously since it applies a totally pipeline design structure, thus effectively utilizing each processing clock, largely shortening the time consumption of terminal hardware accelerator, and guaranteeing the stable operation of the software platform on the side of time, so as to effectively improve the operation efficiency of a mobile communication terminal hardware system; the high-speed matched filtering circuit is also very universal, it can adjust the size of the shift register group within the shift buffer selection unit and the number of correlators within the correlator unit so as to make it compatible with a plurality of matched filter algorithms in different application environments; Additionally, the control logic of this matched filter circuit apparatus is simple and easy to be implemented, thus it has very strong practicality and utilization value.

It should be noted that for those skilled in the field, the present invention can be modified or improved to apply to other product fields such as communication and electronics, and all these modifications or variations should belong to the scope of the claims appended to the present invention.

Industrial Applicability

The present invention applies a totally pipeline design structure to buffer data and perform matched filtering simultaneously, thus it effectively utilizes each processing clock, largely shortens the time consumption of terminal hardware accelerator and effectively improves the operation efficiency of a mobile communication terminal hardware system; the present invention can adjust the size of the shift register group within the shift buffer selector unit and the number of correlators internal the correlator unit so as to make it compatible with a plurality of matched filter algorithms in different application environments if desired; Additionally, the control logic of the circuit apparatus in the present invention is simple and easy to be implemented, thus it has very strong practicality and utilization value.

I claim:

1. A matched filtering circuit apparatus in a baseband processing system of a terminal device, the matched filtering circuit apparatus being located in a joint detection circuit in said baseband processing system, and said matched filtering circuit apparatus comprising a control unit, a V vector buffer unit, a shift integral selection unit, a correlator unit, as well as a coherent integral unit, wherein, said control unit is configured to control processes of de-scrambling, de-spreading, de-rotating and maximum ratio combining data; an output port of said control unit connects to said V vector buffer unit, said shift integral selection unit and said coherent integral unit simultaneously;

said V vector buffer unit is configured to perform data buffering when the matched filtering circuit apparatus performs matched filtering operations;

a front end of said coherent integral unit connects to the correlator unit, and also connects to said V vector buffer unit and said shift integral selection unit through said correlator unit; and said correlator unit is configured to perform correlated processing for parallel data and perform a summation operation on correlated processing results.

2. A matched filtering circuit apparatus of claim 1, wherein, input ports of said correlator unit connect to an output port of said V vector buffer unit and an output port of said shift integral selection unit, the output port of said V vector buffer unit provides the correlator unit with V vectors for matching operations, the output port of said shift integral selection unit provides said correlator unit with correct antenna sampling data for matching operations, and correlated operations, that is, matched filtering operations are performed on said V vectors and antenna sampling data in said correlator unit.

3. A matched filtering circuit apparatus of claim 2, wherein, said control unit comprises a control signal generation logic unit and a counter, wherein, said control signal generation logic unit is located at the output port of said control unit;

said counter connects to said control signal generation logic unit and is configured to count under the control of a matched filtering start indication signal, and send the counted result to the control signal generation logic unit as a time coordinate of a matched filter.

4. A matched filtering circuit apparatus of claim 3, wherein, said control signal generation logic unit is located behind said counter and is configured to generate and output a V vector buffer unit control signal, a shift buffer enabling and selection control signal, and an integral unit control signal.

5. A matched filtering circuit apparatus of claim 4, wherein, said V vector buffer unit comprises a plurality of two-port serial buffers, and the two-port serial buffers are configured to buffer V vector elements serially and read out the V vector elements from buffers simultaneously under the control of said V vector buffer unit control signal.

6. A matched filtering circuit apparatus of claim 5, wherein, said shift integral selection unit comprises two shift buffer register groups and one selector group, wherein, said selector group is located between the two shift buffer register groups and configured to sample and output antenna data buffered in real time in said shift integral selection unit under the control of said shift buffer enabling and selection control signal.

7. A matched filtering circuit apparatus of claim 6, wherein, said correlator unit comprises a plurality of correlators and an adder group, wherein, each correlator is configured to multiply said V vector elements with said antenna data, and an output port of each correlator directly connects to an input port of said adder group;

said adder group is configured to accumulate the multiplication result of a single correlator.

8. A matched filtering circuit apparatus of claim 7, wherein, said coherent integral unit comprises a selector, a coherent integral accumulator and a coherent integral buffer, wherein, an input port of said coherent integral accumulator connects to output ports of said selector and said correlator unit;

said coherent integral accumulator is configured to implement integral operation on all chip sample data of all symbols in code channels under the control of said integral unit control signal, and an output port of the coherent integral accumulator connects to an input port of the coherent integral buffer.

9. A matched filtering method in a baseband processing system of a terminal device, said method comprising the following steps of:

providing a matched filter circuit apparatus which comprises a control unit, a coherent integral unit and a coherent integral buffer;

the control unit of said matched filtering circuit apparatus generating and outputting a coherent integral control signal;

wherein said coherent integral control signal is in valid state in a working clock of a first calculation period of each group of demodulated data, while in invalid state in a working clock of a second calculation period of each group of demodulated data, which always repeats when a matched filter is in working state;

when said coherent integral control signal is valid, the coherent integral unit in said matched filtering circuit apparatus directly accumulating the current input correlated summation and buffering the accumulation result into the coherent integral buffer of said matched filtering circuit apparatus as calculation result of the current period; and when said coherent integral control signal is invalid, said coherent integral unit of the matched filtering circuit apparatus accumulating the current input correlated summation result and calculation result of the first calculation period buffered in said coherent integral buffer of the matched filtering circuit apparatus to demodulate out a group of complete symbol data.

* * * * *